United States Patent
Nand et al.

(10) Patent No.: US 11,539,770 B1
(45) Date of Patent: Dec. 27, 2022

(54) HOST-TO-KERNEL STREAMING SUPPORT FOR DISPARATE PLATFORMS

(71) Applicant: Xilinx, Inc., San Jose, CA (US)

(72) Inventors: Heera Nand, Hyderabad (IN); Sahil Goyal, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 57 days.

(21) Appl. No.: 17/201,172

(22) Filed: Mar. 15, 2021

(51) Int. Cl.
*H04L 65/61* (2022.01)
*G06F 30/392* (2020.01)
*G06F 111/02* (2020.01)

(52) U.S. Cl.
CPC ............ *H04L 65/61* (2022.05); *G06F 30/392* (2020.01); *G06F 2111/02* (2020.01)

(58) Field of Classification Search
CPC ..... H04L 65/61; G06F 30/392; G06F 2111/02
See application file for complete search history.

(56) References Cited

U.S. PATENT DOCUMENTS

| | | | |
|---|---|---|---|
| 7,577,707 B2 | 8/2009 | Hufferd et al. | |
| 7,590,790 B2 | 9/2009 | Wang et al. | |
| 7,752,349 B2 | 1/2010 | Ishida et al. | |
| 8,504,373 B2 | 8/2013 | Bansal et al. | |
| 10,412,130 B2 * | 9/2019 | Cho | H04L 65/1059 |
| 10,725,942 B2 | 7/2020 | Thyamagondlu et al. | |
| 10,740,210 B1 * | 8/2020 | Schumacher | G06F 8/452 |
| 10,924,430 B2 | 2/2021 | Thyamagondlu et al. | |
| 10,970,904 B1 * | 4/2021 | Kosmiskas | H04L 65/1089 |
| 2003/0021346 A1 | 1/2003 | Bixby | |

(Continued)

FOREIGN PATENT DOCUMENTS

| WO | 2010/012568 A1 | 2/2010 |
|---|---|---|
| WO | 2020097013 A1 | 5/2020 |

OTHER PUBLICATIONS

Ravi Sunkavalli: "Network Acceleration", Xilinx Developer Forum 2018 (Silicon Valley). Oct. 1, 2018 (Oct. 1, 2018), XP055684236, Retrieved from the Internet: URL: https://www.xilinx.com/content/dam/xinx/imgs/developer-forum/2018-silicon-valley/Cloud-Converged-ID-Acceleration- Platform. pdf [retrieved on Apr. 8, 2020] p. 5-p. 13.

(Continued)

*Primary Examiner* — Kristie D Shingles
(74) *Attorney, Agent, or Firm* — Kevin T. Cuenot

(57) ABSTRACT

Providing host-to-kernel streaming support can include determining a platform circuitry for use with a streaming kernel of a circuit design. The streaming kernel is configured for implementation in a user circuitry region of an integrated circuit (IC) to perform tasks offloaded from a host computer. The platform circuitry is configured for implementation in a static circuitry region of the IC. The platform circuitry is configured to establish a communication link with the host computer. An adaptable streaming controller can be inserted within the circuit design. The adaptable streaming controller is configured for implementation in the user circuitry region and connects to the streaming kernel. The adaptable streaming controller further communicatively links the streaming kernel with the platform circuitry. The adaptable streaming controller can be parameterized for exchanging data between the platform circuitry and the streaming kernel based, at least in part, on a type of the platform circuitry.

17 Claims, 6 Drawing Sheets

(56) References Cited

U.S. PATENT DOCUMENTS

| | | |
|---|---|---|
| 2003/0097498 A1 | 5/2003 | Sano |
| 2004/0019729 A1 | 1/2004 | Kelley |
| 2005/0114566 A1 | 5/2005 | Chen |
| 2005/0228913 A1 | 10/2005 | Matthews et al. |
| 2006/0265531 A1 | 11/2006 | Adams et al. |
| 2007/0208895 A1 | 9/2007 | Chang et al. |
| 2010/0186014 A1 | 7/2010 | Vaghani |
| 2010/0321397 A1 | 12/2010 | Ginzburg |
| 2013/0160016 A1 | 6/2013 | Gummaraju |
| 2015/0134891 A1 | 5/2015 | Jo |
| 2015/0163273 A1* | 6/2015 | Radcliffe ............ H04L 43/0894 709/231 |
| 2016/0203091 A1 | 7/2016 | Lee |
| 2017/0206169 A1 | 7/2017 | Coppola |
| 2019/0065290 A1 | 2/2019 | Custodio et al. |
| 2019/0138493 A1 | 5/2019 | Teh |
| 2020/0153756 A1 | 5/2020 | Thyamagondlu et al. |

OTHER PUBLICATIONS

Xilinx Product Guide, Vivado Design Suite, PG302 (v1.0) Apr. 17, 2018, QDMA Subsystem for PCI Express v1.0, 157 pages.

\* cited by examiner

600

Determining a platform circuitry for use with a streaming kernel of a user circuit design, wherein the streaming kernel is configured for implementation in a user circuitry region of an integrated circuit to perform tasks offloaded from a host computer
602

Inserting an adaptable streaming controller within the circuit design, wherein the adaptable streaming controller is configured for implementation in the user circuitry region and connects to the streaming kernel, the adaptable streaming controller communicatively linking the streaming kernel with the platform circuitry
604

Parameterizing the adaptable streaming controller for exchanging data between the platform circuitry and the streaming kernel based, at least in part, on a type of the platform circuitry
606

FIG. 6

HOST-TO-KERNEL STREAMING SUPPORT FOR DISPARATE PLATFORMS

TECHNICAL FIELD

This disclosure relates to integrated circuits (ICs) and, more particularly, to providing host-to-kernel streaming support for disparate platforms implemented within an IC.

BACKGROUND

Modern computing environments often include a host computer coupled to an accelerator card. The accelerator card includes an integrated circuit (IC) to which tasks may be offloaded from the host computer. The IC typically includes different types of circuitry such as infrastructure circuitry that allows the IC to communicate with the host computer and/or other resources located on the accelerator card. The IC also includes user circuitry that actually performs the tasks offloaded from the host computer.

In the usual case, the infrastructure circuitry is provided by an entity other than the entity designing the user circuitry. For example, the infrastructure circuitry may be developed by the IC provider, the accelerator card provider, or a data center operator. The user circuitry must be implemented to interact with the platform circuitry to function as intended within the computing environment. Appreciably, any resources of the IC that are utilized by the infrastructure circuitry are not available for use by the user circuitry or user circuit designs intended for implementation in the IC.

SUMMARY

A method can include determining, by computer hardware, a platform circuitry for use with a streaming kernel of a circuit design, wherein the streaming kernel is configured for implementation in a user circuitry region of an integrated circuit (IC) to perform tasks offloaded from a host computer. The platform circuitry is configured for implementation in a static circuitry region of the IC. The platform circuitry is also configured to establish a communication link with the host computer. The method can include inserting, by the computer hardware, an adaptable streaming controller within the circuit design. The adaptable streaming controller is configured for implementation in the user circuitry region and connects to the streaming kernel. The adaptable streaming controller further communicatively links the streaming kernel with the platform circuitry. The method also can include parameterizing, by the computer hardware, the adaptable streaming controller for exchanging data between the platform circuitry and the streaming kernel based, at least in part, on a type of the platform circuitry.

A system includes a processor configured to initiate operations. The operations can include determining a platform circuitry for use with a streaming kernel of a circuit design, wherein the streaming kernel is configured for implementation in a user circuitry region of an IC to perform tasks offloaded from a host computer. The platform circuitry is configured for implementation in a static circuitry region of the IC. The platform circuitry is also configured to establish a communication link with the host computer. The operations can include inserting an adaptable streaming controller within the circuit design. The adaptable streaming controller is configured for implementation in the user circuitry region and connects to the streaming kernel. The adaptable streaming controller further communicatively links the streaming kernel with the platform circuitry. The operations also can include parameterizing the adaptable streaming controller for exchanging data between the platform circuitry and the streaming kernel based, at least in part, on a type of the platform circuitry.

An IC can include a static circuitry region that includes a platform circuitry. The platform circuitry is configured to establish a communication link with a host computer. The IC can include a user circuitry region. The user circuit region includes a streaming kernel and an adaptable streaming controller. The streaming kernel is configured to perform tasks offloaded from the host computer. The adaptable streaming controller is configured to connect to the streaming kernel and communicatively links the streaming kernel with the platform circuitry. The adaptable streaming controller also is configured to exchange data between the platform circuitry and the streaming kernel based, at least in part, on a type of the platform circuitry.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular examples shown. Various aspects and advantages will become apparent upon review of the following detailed description and upon reference to the drawings.

FIG. 6 illustrates an example method of implementing a circuit design including one or more streaming kernels.

DETAILED DESCRIPTION

Figure 1:
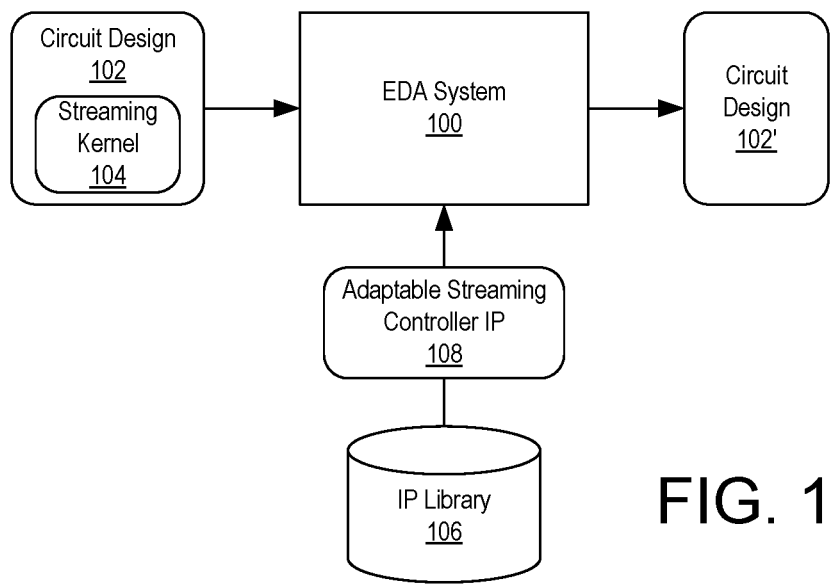
FIG. 1 illustrates an example Electronic Design Automation (EDA) system.

This disclosure relates to integrated circuits (ICs) and, more particularly, to providing host-to-kernel streaming support for disparate platforms implemented within an IC. A computing environment may include a host computer and an accelerator card having an IC that is configured to perform tasks offloaded from the host computer. The IC typically includes platform circuitry and one or more kernels. The platform circuitry implements the infrastructure necessary for the IC to communicate with the host computer and/or other components of the accelerator card. The kernels may represent user-specified circuitry that is intended to perform the tasks offloaded from the host computer. The platform circuitry also functions as part of the interface for the kernel(s) to communicate with the host computer and/or other components of the accelerator card.

The platform circuitry is usually provided by an entity that is different from the entity creating the kernels. The kernel(s) must be developed to integrate or interface with the platform circuitry. There may be a variety of different types of platform circuitry available for use with kernels. Each different type of platform circuitry may have a circuit architecture that is particular to the type of platform circuitry and may facilitate a particular manner of communication between the host computer and the kernel(s) implemented in the IC. These different types of platform circuitries are examples of disparate platforms.

In accordance with the inventive arrangements described within this disclosure, an adaptable streaming controller is provided that may be implemented with streaming kernel(s). The adaptable streaming controller is capable of implementing data mover functionality to link streaming kernel(s) with any of a variety of different platform circuitries. In one aspect, the adaptable streaming controller may be inserted into a circuit design including one or more streaming kernels automatically. The adaptable streaming controller may be implemented in a region of circuitry of the IC reserved for implementing the streaming kernels. This region is referred to as the user circuitry region. The platform circuitry is implemented in a different region of the IC referred to as the static circuitry region. By implementing the adaptable streaming controller automatically and when needed in the user circuitry region with the streaming kernel(s), the size and complexity of the platform circuitry may be reduced.

Using a platform circuitry that is smaller is size leaves more resources of the IC available to implement streaming kernel(s). Further, in those cases where streaming kernels are not used, the adaptable streaming controller need not be implemented. This means that the same platform circuitry may be used regardless of whether the kernels to be implemented in the IC are streaming enabled. User designs including kernels may be migrated from one platform circuitry to another platform circuitry where insertion of the adaptable streaming controller handles connectivity between the platform circuitry and the streaming kernels. The circuit design including the streaming kernels need not be modified when migrating the circuit design from one type of platform circuitry to another.

Further, the adaptable streaming controller may be parameterized (e.g., customized) for the particular use case defined by the user circuit design. As such, the adaptable streaming controller (or controllers as the case may be) may be customized specifically for the use case at hand so as only to consume sufficient resources of the IC to meet the needs of the streaming kernels included in the user circuit design.

FIG. 1 illustrates an example Electronic Design Automation (EDA) system 100. An example architecture for implementing an EDA system is described in connection with FIG. 7. In the example, EDA system 100 is capable of receiving a circuit design 102. Circuit design 102 may be specified in a hardware description language. For example, circuit design 102 may be specified as a Register Transfer Level (RTL) description or as a netlist. Circuit design 102 includes a streaming kernel 104. It should be appreciated that circuit design 102 may include more than one streaming kernel 104. Streaming kernel 104 specifies a sub-circuit that is capable of performing a task. The task may be one that has been offloaded from a host computer. For purposes of discussion, circuit design 102 is considered an example of a user-specified circuit design or user circuit design.

EDA system 100 is capable of accessing an Intellectual Property (IP) library 106 to retrieve an adaptable streaming controller IP 108. EDA system 100 is capable of inserting adaptable streaming controller IP 108 within circuit design 102 to generate a modified version thereof shown as circuit design 102'. In one aspect, EDA system 100 is capable of inserting adaptable streaming controller IP 108 into circuit design 102 automatically in response to detecting particular features of circuit design 102. In the example, EDA system 100 further may parameterize adaptable streaming controller IP 108 to specify a particular implementation thereof within circuit design 102'.

As defined herein, the term "Intellectual Property" or "IP" means a pre-designed and reusable unit of logic, cell, or chip layout design in the field of electronic circuit design. An IP, sometimes referred to as a "core," may be expressed as a data structure specifying a description of circuitry that performs a particular function. An IP may be expressed using hardware description language file(s), as a netlist, as a bitstream that programs a programmable IC, or the like. An IP may be used as a building block within circuit designs adapted for implementation within an IC.

An IP may include additional resources such as source code, scripts, high-level programming language models, schematics, documentation, constraints, and the like. Examples of different varieties of IPs include, but are not limited to, digital signal processing (DSP) functions, memories, storage elements, math functions, etc. Some IPs include an optimally floor-planned layout targeted to a specific family of ICs. IPs may be parameterizable in that a user may enter a collection of one or more parameters, referred to as a "parameterization," to activate or change certain functionality of an instance of an IP within a circuit design.

EDA system 100 is capable of processing circuit design 102' through a design flow. A design flow may include one or more phases such as synthesis, placement, and routing. EDA system 100 may also generate configuration data that, when loaded into a suitable IC, physically implements circuit design 102' therein.

Figure 2:
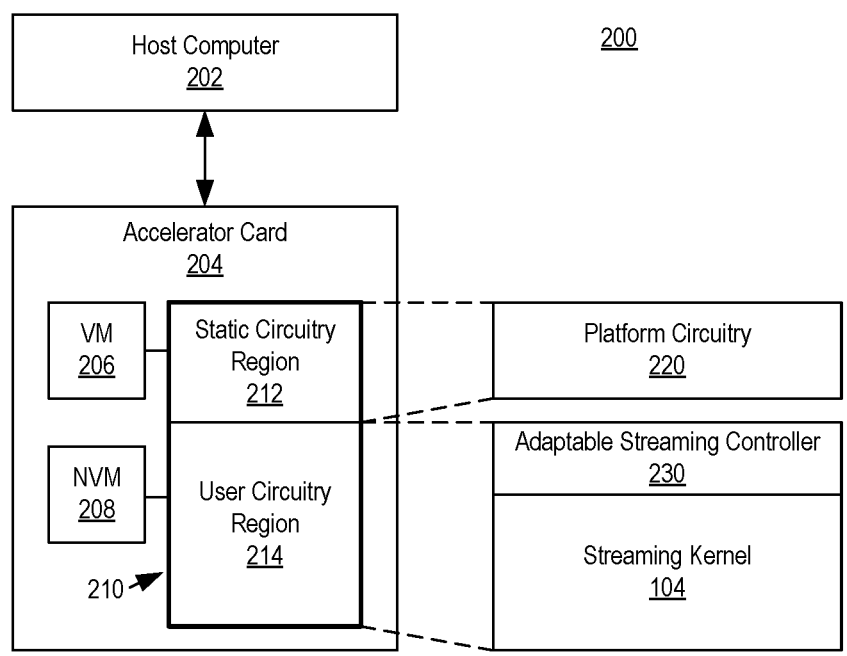
FIG. 2 illustrates an example computing environment including a host computer and an accelerator card.

FIG. 2 illustrates an example computing environment 200 including a host computer 202 and an accelerator card 204. Computing environment 200 may be part of a larger computer system such as a data center or operate as a standalone system. An example implementation of host computer 202 is described in connection with FIG. 7. Host computer 202 is communicatively linked to accelerator card 204 via a communication link. In an example implementation, the communication link may be a Peripheral Component Interconnect Express (PCIe) link.

Accelerator card 204 may be implemented as a circuit board that couples to host computer 202. Accelerator card 204 may, for example, be inserted into a card slot, e.g., an available bus and/or PCIe slot, of host computer 202. In the example, accelerator card 204 includes volatile memory (VM) 206 and non-volatile memory (NVM) 208 both coupled to an IC 210. Volatile memory 206 may be implemented as a random-access memory (RAM) such as a Double Data Rate (DDR) RAM or other suitable RAM. Non-volatile memory 208 may be implemented as flash memory. IC 210 may be implemented as any of a variety of different types of ICs that include at least some programmable circuitry referred to herein as a "programmable IC." For example, IC 210 may be implemented as a Field Programmable Gate Array (FPGA), as an Application-Specific IC (ASIC) that includes some programmable circuitry, as a System-on-Chip (SoC) that includes some programmable circuitry, or the like. Programmable circuitry may include programmable logic. In the example of FIG. 2, IC 210 may include one or more hardwired or application-specific circuit blocks that operate in coordination with circuits implemented using programmable circuitry.

IC 210 is capable of performing one or more tasks offloaded from host computer 202. In the example of FIG. 2, IC 210 is capable of performing the offloaded tasks by way of hardware acceleration where streaming kernels implemented in circuitry in IC 210 perform the offloaded tasks. Performing the offloaded tasks using accelerator card 204 typically provides one or more benefits not attainable were the host processor of host computer 202 to perform the tasks through execution of program code. The benefit(s) provided by IC 210 may be faster performance of the task (e.g., reduced runtime), performing the task while consuming less power than had host computer 202 performed the task, providing redundancy where multiple circuits perform the task possibly in parallel, etc.

In the example of FIG. 2, IC 210 includes a static circuitry region 212 and a user circuitry region 214. Static circuitry region 212 may include one or more hardwired circuit blocks and/or programmable circuitry. Static circuitry region 212 may be configured, by way of loading trusted configuration data into IC 210, to implement platform circuitry 220. Platform circuitry 220 implements the infrastructure that allows circuits implemented in user circuitry region 214 to communicate with host computer 202 and/or resources on accelerator card 204.

In an example implementation, platform circuitry 220 includes an endpoint circuit that is capable of communicating with host computer 202. The endpoint circuit may be a PCIe endpoint. Platform circuitry 220 also may include one or more memory controllers for accessing (e.g., reading and/or writing) volatile memory 206 and/or non-volatile memory 208. The infrastructure provided by platform circuitry 220 may be implemented using hardwired circuit blocks, programmable circuitry, or a combination thereof.

User circuitry region 214 may include one or more hardwired circuit blocks and/or programmable circuitry. In one aspect, user circuitry region 214 is exclusive and independent of static circuitry 212. User circuitry region 214 may be configured, by way of loading configuration data corresponding to circuit design 102' into IC 210, to implement adaptable streaming controller 230 and streaming kernel 104 therein. In the example of FIG. 2, adaptable streaming controller 230 represents the physical implementation (e.g., circuitry) of adaptable streaming controller IP 108. In FIG. 2, streaming kernel 104 represents the physical implementation (e.g., circuitry) of streaming kernel 104 of FIG. 1.

It should be appreciated that circuit design 102' may implement one or more instances of adaptable streaming controller 230 in IC 210 and/or one or more streaming kernels in IC 210. Each of the instances of the adaptable streaming controller 230 and/or streaming kernels 104 may be parameterized on an individual basis. Adaptable streaming controller 230 and/or streaming kernel 104 may be implemented using programmable circuitry or a combination of one or more hardwired circuit blocks and programmable circuitry.

In an example, static circuitry region 212 is a region of circuitry that is capable of remaining operational while user circuitry region 214 is reconfigured. As an illustrative and non-limiting example, static circuitry region 212 and user circuitry region 214 each may be implemented as a partial reconfiguration region on IC 210. As such, platform circuitry 220 may continue to operate uninterrupted while user circuitry region 214 is reconfigured to implement different circuitry (e.g., different adaptable streaming controller 230 and/or streaming kernel(s) 104) therein. Platform circuitry 220 is capable of maintaining the communication link with host computer 202 and/or other components of accelerator card 204 while user circuitry region 214 undergoes partial reconfiguration.

In an example implementation, host computer 202 executes a runtime engine (e.g., program code) that is capable of communicating with accelerator card 204 and/or IC 210. In this regard, in executing the runtime engine, host computer 202 is capable of exchanging data with accelerator card 204 and, more particularly, with streaming kernel 104.

Figure 3:
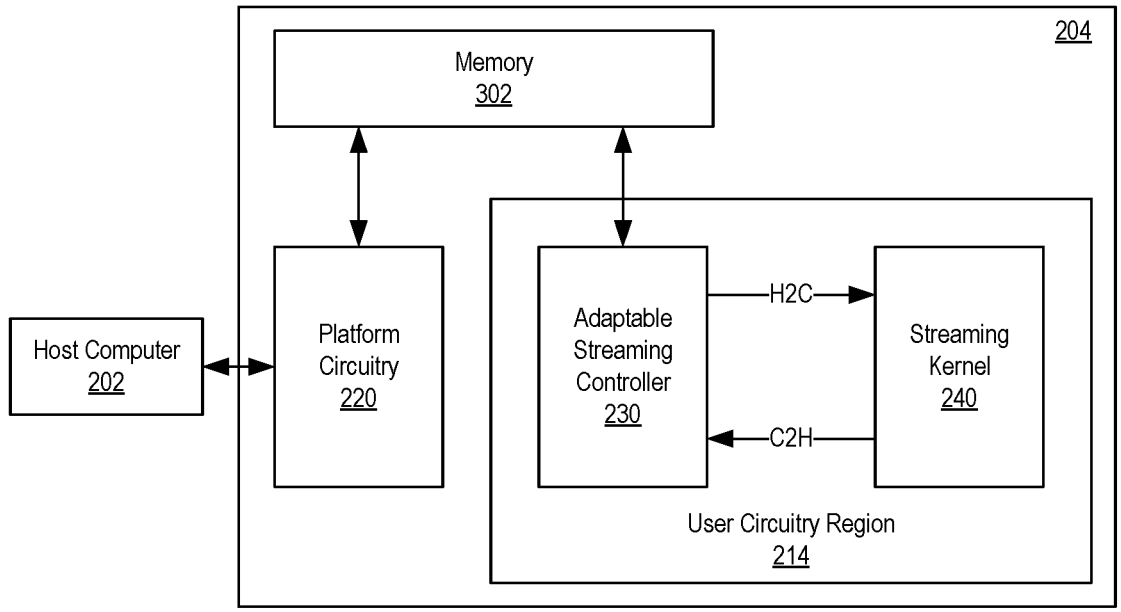
FIG. 3 illustrates an example circuit architecture including an adaptable streaming controller configured for use with a first type of platform circuit.

FIG. 3 illustrates an example circuit architecture including adaptable streaming controller 230 configured for use with a first type of platform circuitry 220. In the example of FIG. 3, platform circuitry 220 facilitates communication between host computer 202 and user circuitry region 214 by way of a memory 302. In one aspect, memory 302 represents volatile memory 206 of accelerator card 204. In that case, memory 302 is external to IC 210 albeit still mounted on accelerator card 204. In another aspect, memory 302 represents memory that is implemented within, or as part of, IC 210. For example, IC 210 may include RAM included therein. In one aspect, IC 210 is implemented as a single die that includes static circuitry region 212, user circuitry region 214, and memory 302. In another example, IC 210 is implemented as a multi-die IC where one of the dies implements memory 302 while one or more other dies coupled thereto implements static circuitry region 212 and user circuitry region 214. As an illustrative and non-limiting example, memory 302 may be implemented as a high-bandwidth memory sometimes referred to as an "HBM."

Accordingly, any data sent from host computer 202 to streaming kernel 104 is received by the communication endpoint of platform circuitry 220 and written to memory 302 using the memory controller therein. Adaptable streaming controller 230 reads the data from memory 302 and provides the data to streaming kernel 104 via a host-to-card (H2C) connection. Data generated by streaming kernel 104 is provided to adaptable streaming controller 230 via the card-to-host (C2H) connection. Adaptable streaming controller 230 is capable of writing the data to memory 302. Platform circuitry 220 reads the data generated by streaming kernel 104 from memory 302 and provides the data to host computer 202.

In the example implementations described herein, connections between adaptable streaming controller 230 and memory 302 are implemented as memory-mapped (MM) transactions carried out over a MM interface. An example of a MM interface is one that is compatible with the Advanced Microcontroller Bus Architecture (AMBA) eXtensible Interface (AXI) (hereafter "AXI") protocol. AXI defines an embedded microcontroller bus interface for use in establishing on-chip connections between circuit blocks and/or systems. AXI further defines MM connections and stream connections.

In general, a MM connection is a multi-channel connection involving the conveyance of address and control data for one circuit to initiate read transactions and write transactions with respect to another circuit. By comparison, a stream connection refers to a single-channel connection for the transmission of streaming data from a first circuit to a second circuit. A stream connection may be a point-to-point connection while a MM connection may be implemented over a bus with multiple possible destinations for read and write transactions. Any connections described within this disclosure as "H2C" or "C2H" are stream connections.

Figure 4:
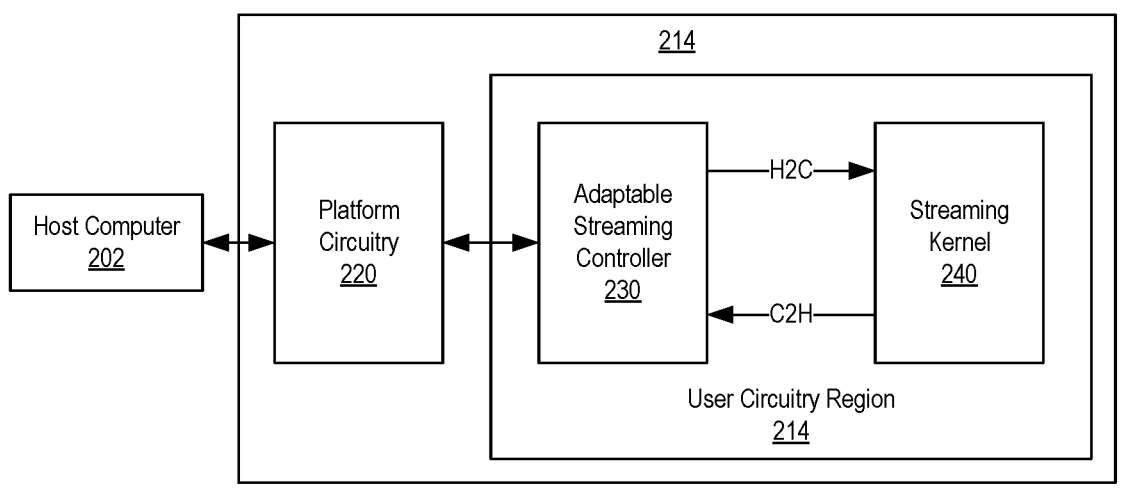
FIG. 4 illustrates an example circuit architecture including an adaptable streaming controller for use with a second type of platform circuitry.

FIG. 4 illustrates an example circuit architecture including adaptable streaming controller 230 for use with a second type of platform circuitry 220. In the example of FIG. 4, platform circuitry 220 facilitates communication between host computer 202 and user circuitry region 214 by way of a more direct connection. In the example, platform circuitry 220 has a MM connection with adaptable streaming controller 230. In the example of FIG. 4, data to be exchanged with accelerator card 204 is stored in a memory of host computer 202 as opposed to memory 302 of FIG. 3.

In the example of FIG. 4, any data sent from computer 202 to streaming kernel 104 is received by the communication endpoint of platform circuitry 220. Platform circuitry 220 sends the data as a MM transaction over the MM connection to adaptable streaming controller 230. Adaptable streaming controller 230 sends the data to streaming kernel 104 via the H2C connection. Data generated by streaming kernel 104 is provided to adaptable streaming controller 230 via the C2H connection. Adaptable streaming controller 230 is capable of sending the data to platform circuitry 220 over the MM connection. Platform circuitry 220 sends the data to host computer 202.

In the examples of FIGS. 3 and 4, the runtime engine executing in host computer 202 is capable of managing the streaming read and streaming write application programming interfaces (APIs) for accessing the adaptable streaming controller 230. The runtime engine is capable of allocating a fixed amount of data into the particular memory that is connected to the streaming kernel (e.g., memory 302 in the case of FIG. 3 or a memory located in host computer 202 in the case of FIG. 4).

In one aspect, the runtime engine is capable of communicating and coordinating operation of adaptable streaming controller 230 to support reading and writing using a ping-pong technique. From the perspective of host system 202, write operations provide data to accelerator card 204 while read operations retrieve results from accelerator card 204. The runtime engine may create two buffers of a fixed size (e.g., 2 MB) in particular memory bank allocated to the particular streaming kernel with which host computer 202 is communicating. The runtime engine then transfers the data to a first buffer in the memory bank. With the data stored in the first buffer, the runtime engine is capable of queuing a request to the adaptable streaming controller 230 to push the data from the first buffer to the streaming channel corresponding to the target streaming kernel. As data is pushed to the target streaming kernel from the first buffer, the runtime engine can prepare next data for processing by the target streaming kernel in a second buffer. The runtime engine can queue a further request to the adaptable streaming controller 230 to push data from the second buffer to the target streaming kernel. A similar approach may be used to support the read API where host computer 202 reads data from accelerator card 204.

Figure 5:
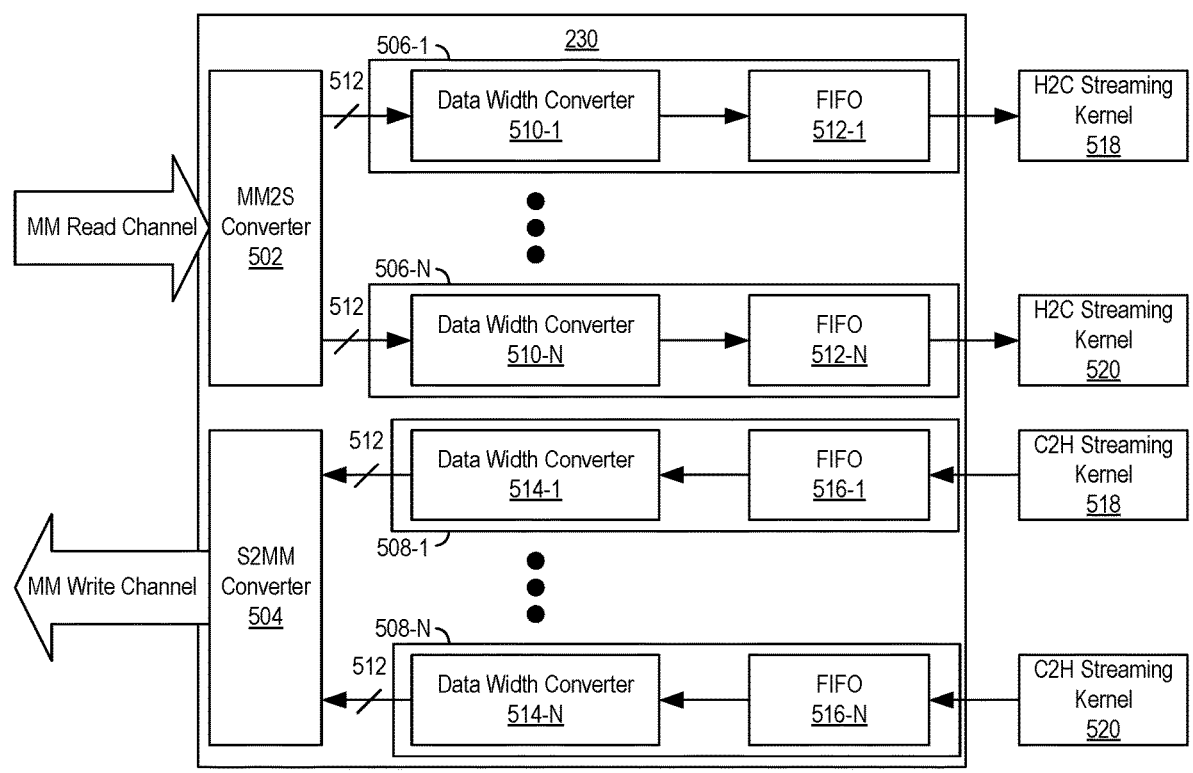
FIG. 5 illustrates an example implementation of an adaptive streaming controller.

FIG. 5 illustrates an example implementation of adaptable streaming controller 230. The example of FIG. 5 illustrates an example of adaptable streaming controller 230 as implemented in IC 210. In this regard, EDA system 100 has inserted adaptable streaming controller IP 108 into circuit design 102, parameterized adaptable streaming controller IP 108 for the particular example use case of FIG. 5, and processed circuit design 102' through a design flow. As part of the insertion and/or design flow, EDA system 100 has connected adaptable streaming controller IP 108 between the user's streaming kernel(s) and user-specified memory banks located on accelerator card 204 or in host computer 202 (e.g., accessible via the communication link between accelerator card 204 and host computer 202).

Adaptable streaming controller 230 can include one or more communication protocol conversion circuits. For example, adaptable streaming controller 230 may include a first communication protocol conversion circuit such as MM2S converter 502 and a second communication protocol conversion circuit such as S2MM converter 504. In general, the communication protocol conversion circuits convert data between MM and streaming data formats.

MM2S converter 502 is capable of connecting to the MM read channel and converting MM data received over the MM read channel in response to MM read transactions to stream data. In an example implementation, the MM read channel may be 512-bits in width. MM read channel may connect to platform circuitry 220 or to memory 302. In one aspect, MM2S converter 502 has a bit-width that matches the bit-width of the particular memory bank to which MM2S converter 502 is coupled via the MM read channel. MM2S converter 502 is capable of outputting the converted data as one or more different 512-bit data streams to the one or more streaming channels 506 connected thereto. MM2S converter 502 is capable of outputting the data over the different streaming channels 506 concurrently. In the example of FIG. 5, streaming channels 506 are configured to operate as H2C streaming channels.

In the example, each of streaming channels 506 includes a data width converter 510 and a First-In-First-Out (FIFO) memory 512. Streaming kernels may have input ports (H2C connections) capable of receiving stream data of varying bit widths. Example bit widths may be 8, 16, 32, 64, etc. As such, in converting MM data to stream data, data width converters 510 are capable of downsizing the received stream data to provide a data stream having a width that matches the target streaming kernel. For example, data width converter 510-1 is capable of downsizing the 512-bit data stream that is received from MM2S converter 502 to a width that is compatible with, or matched to, H2C streaming kernel 518. Similarly, data width converter 510-N is capable of downsizing the 512-bit data stream that is received from MM2S converter 502 to a width that is compatible with, or matched to, H2C streaming kernel 520.

Each streaming channel 506 further may include a FIFO memory 512. FIFO memories 512 are capable of buffering downsized data until such time that the respective streaming kernels are ready to read the data for processing. The particular depth of FIFO memories 512 that is needed may be set on a per streaming kernel basis. That is, some streaming kernels may process data quickly and thus need a FIFO memory of a lesser depth, while other streaming kernels may require a FIFO memory having a larger depth. In this regard, the particular data width conversion operation performed by data width converters 510 and the depths of FIFO memories 512 may be a parameterizable feature of adaptable streaming controller IP 108 and be customized for each of streaming channels 506 based on the particular streaming kernel to which each streaming channel 506 is connected and the rate at which the streaming kernel consumes received data. In this regard, the number of streaming channels 506 is also a parameterizable feature of adaptable streaming controller IP 108.

S2MM converter 504 is capable of connecting to a MM write channel and converting stream data received from one or more stream kernels to MM write transactions for sending over the MM write channel to platform circuitry 220 or memory 302. In an example implementation, the MM write channel may be 512-bits in width. S2MM converter 504 is capable of receiving one or more 512-bit data streams from the one or more different streaming channels 508 and outputting the converted data as 512-bit MM write transactions over the MM write channel. In the example of FIG. 5, streaming channels 508 are configured to operate as C2H streaming channels.

In the example, each of streaming channels 508 includes a data width converter 514 and a FIFO memory 516. Streaming kernels may have output ports (C2H connections) capable of conveying stream data of varying bit widths. Example bit widths may be 8, 16, 32, 64, etc. The bit width of the C2H connection of a streaming kernel may be the same as or differ from the bit width of the H2C connection of the streaming kernel. As such, data width converters 514 are capable of upsizing the received stream data to provide a data stream having a width (e.g., 512-bits) that matches the MM write channel. For example, data width converter 514-1 is capable of upsizing the data stream received from C2H streaming kernel 518 to 512-bits. Similarly, data width converter 514-N is capable of upsizing the data stream received from C2H streaming kernel 520 to 512-bits.

Each streaming channel 508 further may include a FIFO memory 516. FIFO memories 516 are capable of buffering data from streaming kernels until such time that the respective data width converters 514 are ready to process the data. The particular depth of FIFO memories 516 that is needed may be set on a per streaming kernel basis and, more particularly, on a per-streaming channel connection basis. That is, some streaming kernels may generate data quickly and thus need a FIFO memory having a greater depth to which to output data, while other streaming kernels may need a FIFO memory of a lesser depth. In this regard, the particular data width conversion operation performed by data width converters 514 and the particular depths of FIFO memories 516 may be a parameterizable feature of adaptable streaming controller IP 108 and be customized for each of streaming channels 506 based on the particular streaming kernel to which each streaming channel 508 is connected and the rate at which the streaming kernel generates or outputs data. In this regard, the number of streaming channels 508 is also a parameterizable feature of adaptable streaming controller IP 108.

In the example of FIG. 5, each streaming kernel 518, 520 includes an H2C connection and a C2H connection. The H2C and C2H connections of streaming kernels 518, 520 are shown separately despite belonging to the same streaming kernel to illustrate that the streaming kernel is capable of reading and writing concurrently to the memory. In other cases, streaming kernels may include an H2C connection only or a C2H connection only. Such streaming kernels may connect to other circuitry in IC 210 to provide data or to obtain data for processing so that only one streaming connection with adaptable streaming controller 230 is needed. It should be appreciated that adaptable streaming controller 230 may operate with one or more of such streaming kernels, one or more of streaming kernels having both an H2C and C2H connections, or any combination thereof based on the parameterization of adaptable streaming controller IP 108.

FIG. 6 illustrates an example method 600 of implementing a circuit design including one or more streaming kernels. Method 600 may be performed by an EDA system as described within this disclosure in connection with FIG. 1.

In block 602, EDA system 100 is capable of determining a platform circuitry 220 for use with a streaming kernel 104 of a circuit design 102. The streaming kernel 104 is configured for implementation in user circuitry region 214 of IC 210 to perform tasks offloaded from host computer 202. The platform circuitry 220 may be configured for implementation in static circuitry region 212 of IC 210 and to establish a communication link with host computer 202. In one aspect, EDA system 100 is capable of determining the platform circuitry 220 from circuit design 102 wherein the platform circuitry 220 is specified or indicated therein.

In another aspect, as part of determining the particular platform circuitry 220 to be used, EDA system 100 further detects the type of platform circuitry 220. The type of the platform circuitry defines the manner in which data is exchanged with the adaptable streaming controller. One type corresponds to the example of FIG. 3, while a different type corresponds to the example of FIG. 4. EDA system 100, for example, may be programmed with a data structure that correlates different platform circuitries with types thereby allowing the EDA system 100 to cross-reference the platform circuitry 220 with a particular type.

In block 604, EDA system 100 is capable of inserting an adaptable streaming controller 230 within circuit design 102. For example, EDA system 100 inserts the adaptable streaming controller 230 within circuit design 102 by inserting the adaptable streaming controller IP 108 within circuit design 102. The adaptable streaming controller 230, e.g., as specified by adaptable streaming controller IP 108, is configured for implementation in user circuitry region 214 and further connects to streaming kernel 104. The adaptable streaming controller 230 communicatively links streaming kernel 104 with platform circuitry 220.

In one aspect, EDA system 100 is capable of automatically inserting adaptable streaming controller 230 within circuit design 102. For example, EDA system 100 is capable of reading a user provided configuration file that specifies how the streaming kernel 104 is to be connected to platform circuitry (e.g., via streaming interconnects or another connection type such as MM). EDA system 100 is capable of determining that the platform circuitry determined in block 602 is a variety that does not include native support for streaming kernels. Accordingly, in response to detecting that the platform circuitry is of the type corresponding to the examples of FIGS. 3 and/or 4 and that the configuration file indicates streaming connectivity, EDA system 100 automatically inserts adaptable streaming controller 230 into circuit design 102.

In block 606, the EDA system 100 is capable of parameterizing the adaptable streaming controller 230 for exchanging data between the platform circuitry 220 and the streaming kernel 104 based, at least in part, on a type of the platform circuitry 220.

In one aspect, where the platform circuitry 220 is of the type described in connection with FIG. 3, the adaptable streaming controller 230 links the streaming kernel 104 with the platform circuitry 220 by way of a memory that is accessible to both platform circuitry 220 and adaptable streaming controller 230. In another aspect, where the platform circuitry 220 is of the type described in connection with FIG. 4, the adaptable streaming controller 230 links streaming kernel 104 with platform circuitry 220 by having a direct connection to platform circuitry 220. As such, the adaptable streaming controller 230 may be parameterized to connect one or more user-specified memory banks. The memory banks may be RAM (e.g., DDR) or HBM as described in connection with FIG. 3 or a memory in host computer 202 as described in connection with FIG. 4. The EDA system 100 is capable of making the connections between the adaptable streaming controller, the platform circuitry or memory as the case may be, and the streaming kernel based, at least in part, on the user-provided parameterization.

The foregoing and other implementations can each optionally include one or more of the following features, alone or in combination. Some example implementations include all the following features in combination.

In one aspect, the adaptable streaming controller can include a communication protocol conversion circuit and a streaming channel connecting the streaming kernel to the communication protocol conversion circuit.

The parameterizing may specify a target circuit to which the communication protocol conversion circuit connects the streaming channel. The target circuit, for example, may be a memory as illustrated in FIG. 3 or the platform circuitry as illustrated in FIG. 4 (e.g., where the memory for the streaming kernel is located in the host computer).

The streaming channel can include a FIFO memory. The parameterizing may specify a depth of the FIFO memory. The depth of the FIFO memory may be determined on a per-streaming channel basis according to the data throughput (e.g., the rate of data consumption and/or rate of data output) of the particular streaming kernel connected to the FIFO memory.

The streaming channel can include a data width converter. The parameterizing may specify a particular data width conversion operation performed by the data width converter. The data width conversion operation may be an upsizing operation or a downsizing operation as described in connection with FIG. 5. Further, the degree of upsizing and/or downsizing, e.g., the particular data width conversion operation performed, depends on the bit-width of the port of the streaming kernel to which each streaming channel connects.

In another aspect, the adaptable streaming controller includes a plurality of streaming channels that connect to the streaming kernel. The plurality of streaming channels include at least one of a C2H streaming channel or an H2C streaming channel.

The streaming kernel may be one of a plurality of streaming kernels connected to the adaptable streaming controller. Accordingly, the parameterizing may specify a number of streaming channels to be implemented by the adaptable streaming controller to connect to the plurality of streaming kernels. In one aspect, the number of streaming channels specified by the parameterizing includes a number of C2H streaming channels and a number of H2C streaming channels.

As described in connection with FIG. 6, the EDA system 100 is capable of analyzing circuit design 102 and detecting each of the streaming connections defined therein for streaming kernels. EDA system 100 is capable of including the adaptable streaming controller 230 therein and connecting the adaptable streaming controller to each of the streaming connections of the streaming kernels.

As noted, the adaptable streaming controller IP 108 is parameterizable in a number of different aspects. Aspects such as the number of streaming channels, the type of streaming channel (H2C or C2H), the type of data width conversion operation to be performed on a per-streaming channel basis, and the depth of the FIFO memory on a per-streaming channel basis may be parameterizable features. Further, the circuits connected to the MM2S converter 502 and/or the S2MM converter 504 may be specified via the parameterization. That is, the parameterization may indicate the type of platform circuitry to which the adaptable streaming controller 230 is to connect and/or the target memories. EDA system 100 can make the connections automatically.

Example 1 shows example program code specifying a configuration for an instance of an adaptable streaming controller IP 108.

Example 1 sc:stream_kernel_1.h2c_stream.Memory:DDR[0]
sp:stream_kernel_1.h2c_stream:M_AXI:M_AXI_0
sp:stream_kernel_1.h2c_stream:Depth:1024
sc:stream_kernel_1.c2h_stream.Memory:DDR[0]
sp:stream_kernel_1.c2h_stream:M_AXI:M_AXI_0
sp:stream_kernel_1.c2h_stream:Depth:1024
sc:stream_kernel_2.h2c_stream.Memory:Host[0]
sp:stream_kernel_2.h2c_stream:M_AXI:M_AXI_1
sp:stream_kernel_2.h2c_stream:Depth:64
sc:stream_kernel_2.c2h_stream.Memory:Host[0]
sp:stream_kernel_2.c2h_stream:M_AXI:M_AXI_1
sp:stream_kernel_2.c2h_stream:Depth:64

In Example 1, platform circuitry 220 may have available multiple different memories (DDRs) 0-3 thereby giving the user a choice as to which DDR to use for a particular streaming kernel. Stream connections may be defined using the syntax "sc" for stream connection followed by a stream kernel name, the type of stream connection (H2C or C2H), and which memory is accessed by the stream connection. The syntax "sp" signifies a streaming port and indicates the particular adaptive stream controller instance to which the preceding stream connection connects. For example, the connection for stream_kernel_1 in the H2C case, the following "sp" statement indicates that the streaming connection connects to an instance of the adaptive stream controller corresponding to "M_AXI:M_AXI_0." A second instance of the adaptive stream controller is indicated by "M_AXI:M_AXI_1." That is, Example 1 specifies two instances of the adaptive streaming controller. Thus, the parameterization also specifies the number of instances of the adaptive streaming controllers to be created in circuit design 102.

Referring again to Example 1, the parameter "Depth" in the streaming port instruction lines specifies the depth of the FIFO memory to be used for the streaming channel being defined. The FIFO memory depth may be sized large enough so that the streaming kernel attached thereto is capable of continued operation. The data width conversion operation may be determined automatically by EDA system 100 through inspection of the width of the ports of the streaming kernels defined in circuit design 102.

The inventive arrangements described within this disclosure allow streaming kernels to be used with a variety of different types of platform circuits. By using the adaptive streaming controller(s) described herein, the platform circuitry may be significantly reduced in terms of size and complexity. Support for streaming kernels may be incorporated into circuit designs automatically by an EDA system in response to detecting the presence of streaming kernels. Accordingly, in those cases where streaming kernels are not used, the platform circuitry does not include the overhead of data mover circuitry enabling the use of streaming kernels. Moreover, in those cases where streaming kernels are used, the amount of circuitry implemented to support operation of the streaming kernels depends on the number of streaming kernels that are included in the circuit design and the type of the respective streaming kernels (e.g., number and/or size of ports). As more streaming kernels are used, more streaming channels may be incorporated into the adaptable streaming controller up to the bandwidth constraints of the MM2S converter and/or the S2MM converter, at which point additional instance(s) of the adaptive streaming controller may be included.

Figure 7:
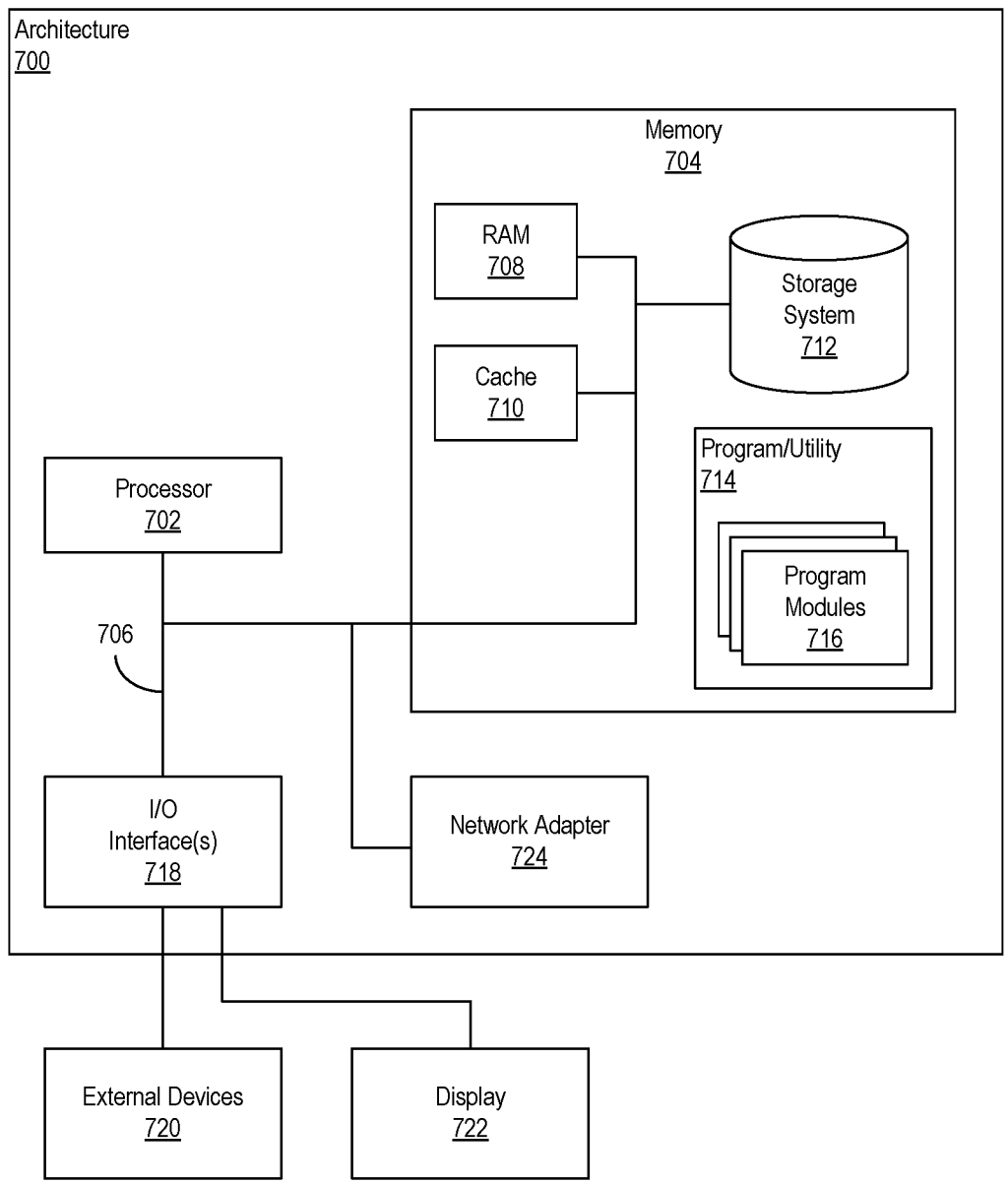
FIG. 7 illustrates an example architecture for a data processing system for use with the inventive arrangements described within this disclosure.

FIG. 7 illustrates an example architecture 700 for a data processing system for use with the inventive arrangements described within this disclosure. The example architecture described in connection with FIG. 7 may be used to implement the EDA system 100 of FIG. 1 and/or the host computer 202 of FIG. 2.

Architecture 700 can be practiced as a standalone device, as a bare metal server, in a cluster (e.g., two or more interconnected computers), or in a distributed cloud computing environment where tasks are performed by remote processing devices that are linked through a communications network, and/or in a data center. In a distributed cloud computing environment, program modules may be located in both local and remote computer system storage media including memory storage devices.

As shown in FIG. 7, architecture 700 can include a processor 702, a memory 704, and a bus 706 that couples various system components including memory 704 to processor 702. Processor 702 may be implemented as one or more processors. In an example, processor 702 is implemented as a central processing unit (CPU). Example processor types include, but are not limited to, processors having an x86 type of architecture (IA-32, IA-64, etc.), Power Architecture, ARM processors, and the like.

Bus 706 represents one or more of any of a variety of communication bus structures. By way of example, and not limitation, bus 706 may be implemented as a PCIe bus. Architecture 700 typically includes a variety of computer system readable media. Such media may include computer-readable volatile and non-volatile media and computer-readable removable and non-removable media.

Memory 704 can include computer-readable media in the form of volatile memory, such as RAM 708 and/or cache memory 710. Architecture 700 also can include other removable/non-removable, volatile/non-volatile computer storage media. By way of example, storage system 712 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 706 by one or more data media interfaces. Memory 704 is an example of at least one computer program product.

Program/utility 714 may be implemented as program code stored in memory 704. As such, program/utility 714 is executable by processor 702. By way of example, the program code may represent an operating system, one or more application programs, other program modules, and program data. Program/utility 714 generally carries out the functions and/or methodologies of the example implementations described within this disclosure. For example, program/utility 714 may include the runtime engine described herein, one or more EDA tools (e.g., program code capable of performing the operations described herein and/or a design flow), and the like. Program/utility 714 and any data items used, generated, and/or operated upon by architecture 700 are functional data structures that impart functionality when employed by architecture 700.

Architecture 700 may communicate with one or more external devices 720 such as a keyboard, a pointing device, a display 722, etc.; one or more devices that enable a user to interact with architecture 700; and/or any devices (e.g., network card, modem, etc.) that enable architecture 700 to communicate with one or more other computing devices. Such communication can occur via input/output (I/O) interfaces 718. Still, a data processing system implemented using architecture 700 can communicate with one or more networks such as a local area network (LAN), a general wide area network (WAN), and/or a public network (e.g., the Internet) via a network adapter 724. As depicted, network adapter 724 communicates with the other components of architecture 700 via bus 706. For example, architecture 700 may connect to accelerator card 204 by way of network adapter 724. It should be understood that although not shown, other hardware and/or software components could be used in conjunction with architecture 700. Examples, include, but are not limited to: microcode, device drivers, redundant processing units, external disk drive arrays, RAID systems, tape drives, and data archival storage systems, etc.

Architecture 700 is only one example implementation of a data processing system. The example of FIG. 7 is not intended to suggest any limitation as to the scope of use or functionality of example implementations described herein. Architecture 700 may be used to implement computer hardware that is capable of performing the various operations described within this disclosure.

Architecture 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Architecture 700 may be operational with numerous other general-purpose or special-purpose computing system environments or configurations. Examples of computing systems, environments, and/or configurations that may be suitable for use with architecture 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using architecture 700 or other suitable data processing system, generally support the FPGA-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

Figure 8:
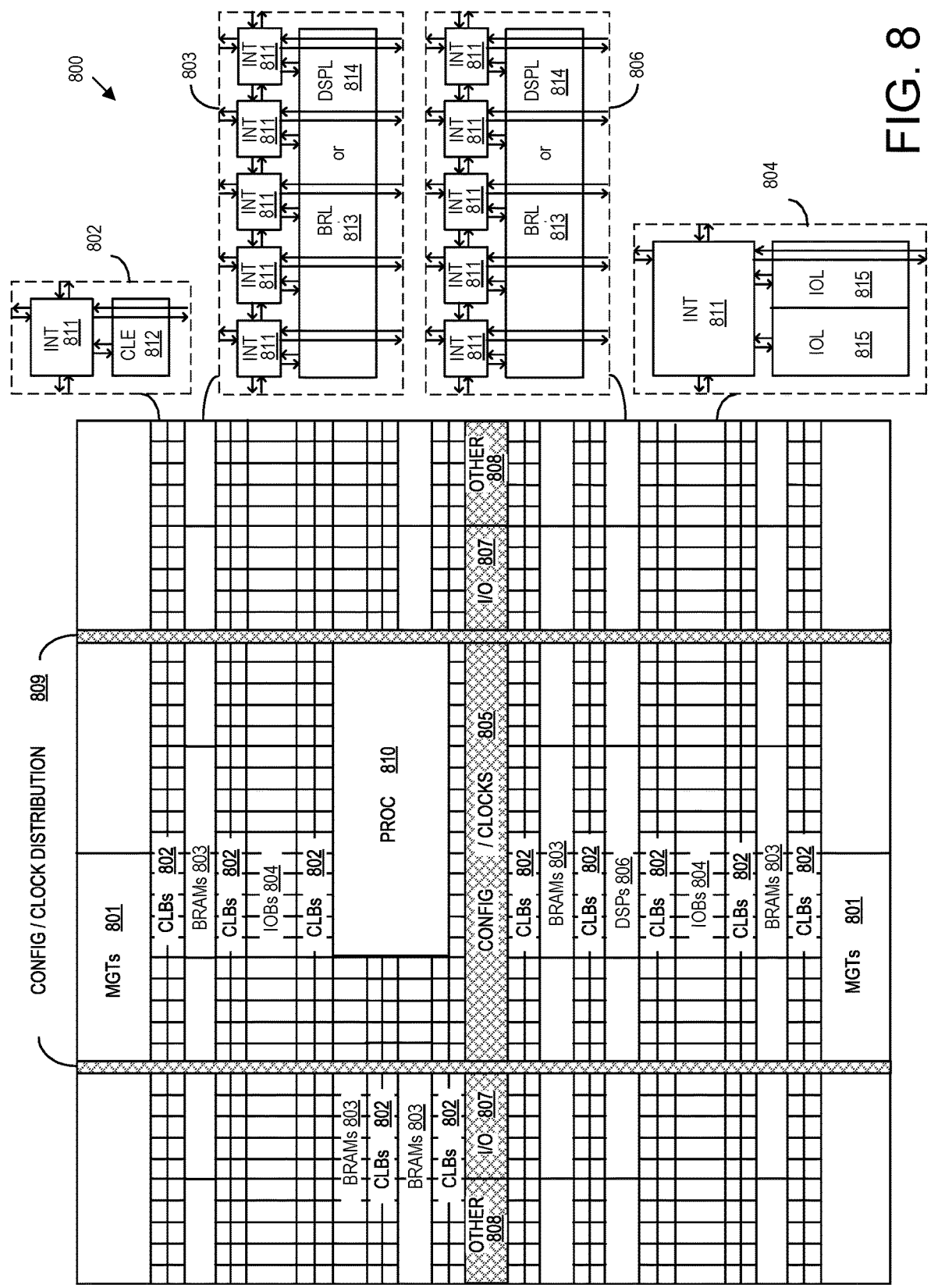
FIG. 8 illustrates an example architecture for an integrated circuit (IC).

FIG. 8 illustrates an example architecture 800 for an IC. Architecture 800 may be used to implement IC 210 of FIG. 2. Architecture 800 may be used to implement a programmable IC such as an FPGA. Architecture 800 may also be representative of an SoC type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the edge of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An IOB 804 may include, for example, two instances of an I/O logic element (IOL) 815 in addition to one instance of an INT 811. The actual I/O pads connected to IOL 815 may not be confined to the area of IOL 815.

In the example pictured in FIG. 8, architecture 800 includes an area near a center of the die or device formed of regions 805, 807, and 808 that may be used for configuration, clock, and other control logic. Areas 809 extending out from this center area may be used to distribute the clocks and configuration signals across the breadth of the device.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 8 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

In the example of FIG. 8, platform circuitry 220 may be implemented using programmable circuitry or a combination of programmable circuitry and one or more hardwired circuit blocks. Adaptable streaming controller 230 and streaming kernel 104 may be implemented using programmable circuitry.

An EDA system 100 as described herein in connection with FIG. 1, for example, is capable of further processing a circuit design having undergone the processing described herein for implementation within an IC having an architecture the same as or similar to that of FIG. 8. The EDA system is capable of synthesizing, placing, and routing the circuit design. The EDA system may also perform bitstream generation so that the bitstream may be loaded into the IC, thereby physically implementing the circuit design within the IC.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   determining, by computer hardware, a platform circuitry for use with a streaming kernel of a circuit design, wherein the streaming kernel is configured for implementation in a user circuitry region of an integrated circuit to perform tasks offloaded from a host computer;
   wherein the platform circuitry is configured for implementation in a static circuitry region of the integrated circuit and to establish a communication link with the host computer;
   inserting, by the computer hardware, an adaptable streaming controller within the circuit design, wherein the adaptable streaming controller is configured for implementation in the user circuitry region and connects to the streaming kernel, the adaptable streaming controller communicatively links the streaming kernel with the platform circuitry;
   wherein the adaptable streaming controller includes a communication protocol conversion circuit and a streaming channel connecting the streaming kernel to the communication protocol conversion circuit; and
   parameterizing, by the computer hardware, the adaptable streaming controller for exchanging data between the platform circuitry and the streaming kernel based, at least in part, on a type of the platform circuitry.

2. The method of claim 1, wherein the parameterizing specifies a target circuit to which the communication protocol conversion circuit connects the streaming channel.

3. The method of claim 1, wherein the streaming channel includes a first-in-first-out memory; and the parameterizing specifies a depth of the first-in-first-out memory.

4. The method of claim 1, wherein the streaming channel includes a data width converter; and the parameterizing specifies a particular data width conversion operation performed by the data width converter.

5. The method of claim 1, wherein
the adaptable streaming controller includes a plurality of streaming channels that connect to the streaming kernel; and
the plurality of streaming channels include at least one of a card-to-host streaming channel or a host-to-card streaming channel.

6. The method of claim 1, wherein the streaming kernel is one of a plurality of streaming kernels connected to the adaptable streaming controller and the parameterizing specifies a number of streaming channels to be implemented by the adaptable streaming controller to connect to the plurality of streaming kernels.

7. The method of claim 6, wherein the number of streaming channels specified by the parameterizing includes a number of card-to-host streaming channels and a number of host-to-card streaming channels.

8. A system, comprising:
a processor configured to initiate operations including:
determining a platform circuitry for use with a streaming kernel of a circuit design, wherein the streaming kernel is configured for implementation in a user circuitry region of an integrated circuit to perform tasks offloaded from a host computer;
wherein the platform circuitry is configured for implementation in a static circuitry region of the integrated circuit and to establish a communication link with the host computer;
inserting an adaptable streaming controller within the circuit design, wherein the adaptable streaming controller is configured for implementation in the user circuitry region and connects to the streaming kernel, the adaptable streaming controller communicatively links the streaming kernel with the platform circuitry;
wherein the adaptable streaming controller includes a communication protocol conversion circuit and a streaming channel connecting the streaming kernel to the communication protocol conversion circuit; and
parameterizing the adaptable streaming controller for exchanging data between the platform circuitry and the streaming kernel based, at least in part, on a type of the platform circuitry.

9. The system of claim 8, wherein the parameterizing specifies a target circuit to which the communication protocol conversion circuit connects the streaming channel.

10. The system of claim 8, wherein the streaming channel includes a first-in-first-out memory; and the parameterizing specifies a depth of the first-in-first-out memory.

11. The system of claim 8, wherein the streaming channel includes a data width converter; and the parameterizing specifies a particular data width conversion operation performed by the data width converter.

12. The system of claim 8, wherein
the adaptable streaming controller includes a plurality of streaming channels that connect to the streaming kernel; and
the plurality of streaming channels include at least one of a card-to-host streaming channel or a host-to-card streaming channel.

13. The system of claim 8, wherein the streaming kernel is one of a plurality of streaming kernels connected to the adaptable streaming controller and the parameterizing specifies a number of streaming channels to be implemented by the adaptable streaming controller to connect to the plurality of streaming kernels.

14. The system of claim 13, wherein the number of streaming channels specified by the parameterizing includes a number of card-to-host streaming channels and a number of host-to-card streaming channels.

15. An integrated circuit, comprising:
a static circuitry region including a platform circuitry, wherein the platform circuitry is configured to establish a communication link with a host computer;
a user circuitry region including:
a streaming kernel, wherein the streaming kernel is configured to perform tasks offloaded from the host computer;
an adaptable streaming controller configured connect to the streaming kernel and communicatively link the streaming kernel with the platform circuitry;
wherein the adaptable streaming controller includes a communication protocol conversion circuit configured to communicate with a target circuit of the static circuitry region and a streaming channel connecting the streaming kernel to the communication protocol conversion circuit; and
wherein the adaptable streaming controller is configured to exchange data between the platform circuitry and the streaming kernel based, at least in part, on a type of the platform circuitry.

16. The integrated circuit of claim 15, wherein the target circuit is the platform circuitry or a memory.

17. The integrated circuit of claim 15, wherein the streaming channel includes:
a first-in-first-out memory having a user-specified depth; and
a data width converter configured to perform a particular data width conversion operation.

* * * * *